United States Patent [19]
Prentice

[11] 4,158,084
[45] Jun. 12, 1979

[54] HEAT SOURCES FOR THERMAL BATTERIES: EXOTHERMIC INTERMETALLIC REACTIONS

[75] Inventor: Jack L. Prentice, Ridgecrest, Calif.

[73] Assignee: The United States of America as represented by the Secretary of the Navy, Washington, D.C.

[21] Appl. No.: 770,246

[22] Filed: Feb. 18, 1977

[51] Int. Cl.$^2$ ............................................. H01M 6/20
[52] U.S. Cl. .................................... 429/112; 126/263
[58] Field of Search .......................... 126/263; 252/70; 429/112, 218, 104

[56] References Cited

U.S. PATENT DOCUMENTS

| | | | |
|---|---|---|---|
| 2,968,932 | 1/1961 | Vance et al. | 126/263 |
| 2,980,103 | 4/1961 | Scribner et al. | 126/263 |
| 3,093,514 | 6/1963 | McCallum et al. | 429/218 |
| 3,535,246 | 10/1970 | Crowell, Jr. et al. | 252/70 |
| 3,558,363 | 1/1971 | Franklin | 429/112 |
| 3,575,714 | 4/1971 | Bennett et al. | 429/112 |
| 3,625,767 | 12/1971 | Clark et al. | 429/112 |
| 3,669,748 | 6/1972 | McCullough et al. | 429/112 |
| 3,885,989 | 5/1975 | Bush | 429/104 |
| 4,041,220 | 8/1977 | Armand | 429/218 |

OTHER PUBLICATIONS

Combustion and Flame (2), pp. 77–89 (1973), Hardt, A. P. and Phung, P. V. "Propogation of Gasless Reactions in Solids-I, Analytical Study of Exothermic Intermetallic Reaction Rates".

Combustion and Flame (2), pp. 91–97 (1973), Hardt, A. P. and Holsinger, R. W., "Propogation of Gasless Reactions in Solids-II, Experimental Study of Exothermic Intermetallic Reaction Rates".

Primary Examiner—Ronald C. Capossela
Attorney, Agent, or Firm—R. S. Sciascia; W. Thom Skeer; Lloyd E. K. Pohl

[57] ABSTRACT

An intimate mixture of two or more finely divided metals is formed into a heat pad or pellet for a thermal battery. The metals are chosen to react exothermically in a self-sustaining manner to provide a heat source for the battery whereby the battery electrolyte, normally a solid, is melted and the battery generates current.

11 Claims, 1 Drawing Figure

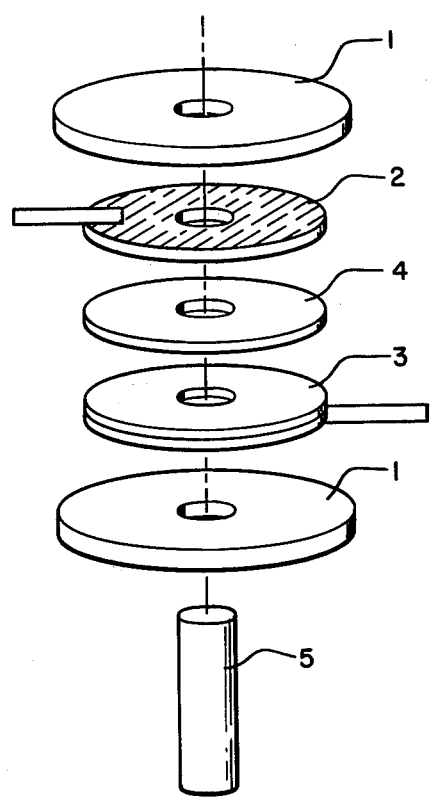

HEAT SOURCES FOR THERMAL BATTERIES: EXOTHERMIC INTERMETALLIC REACTIONS

BACKGROUND OF THE INVENTION

A thermal battery is a special purpose dc power source used mainly in military and aerospace applications where a long shelf life, on the order of 10 to 15 years, and a short operating time, on the order of 1 to 5 minutes, is anticipated. It must be compact and sturdy enough to function under high gravity loads and over a wide temperature range. A thermal battery is characterized by an internal pyrotechnic heat source which, upon reaction melts the electrolyte to activate the battery.

The first thermal batteries were developed in Germany during World War II and were intended for use in the V-I and V-II rockets. Progressing through the fifties, the early designs, often referred to as "cup" or "closed cup" systems, were a stack of disc-shaped cell cups which served as the cathode current collector of the cell and contained electrolyte pads and depolarizer pads used in the electro chemical reaction. To provide the heat source, heat pads were inserted between the cell cups. They were typically made by passing paper or a fiberglass tape through a vat containing a slurry of zirconium fuel and a barium chromate oxidizer. The paper was then dried and heat pads punched out. The pyrotechnic pads heat the electrolyte to a 500° to 600° C. operating range but are disadvantageous in that they may change volume during combustion and deform under heavy g-loads experienced in some applications.

In the mid-fifties the then Naval Ordnance Laboratory and the Eureka-Williams Company developed a "pellet" type of cell which, through refinements, has become the present state of the art. In so-called pellet technology the anode and a "DEB pellet", consisting of the depolarizer, electrolyte, and binder, and a heat pellet are pressed together into a single cell for the battery. The heat pellet is typically a pressed disc of powdered iron fuel and potassium perchlorate oxidizer. This pellet meets most of the requirements of thermal battery operation. It ignites easily, rapidly and safely. It also has the necessary conductivity for pellet technology to electrically connect the cells and delivers the necessary heat to maintain the LiCl-KCL electrolyte at the approximate operating temperature of 485° C. Many production batteries, however, exhibit heating problems such as excessive heat (2000° K.) reactions with the electrolyte and migration of fuel from the heat pad or pellet into the electrolyte. Their reaction is also not completely gasless, which can rupture the sealed battery case.

Present day heat sources using iron fuel have the further drawback of requiring at least 150 msec to attain operating temperature. This is an excessive delay for many battery applications, such as fusing circuits in guided missiles.

Another difficulty encountered by both cup and pellet battery heat sources relates to procurement. Barium chromate and most other products such as heat paper or heat pads and including fine (3 $\mu$m) zirconium powder are sole source items.

SUMMARY OF THE INVENTION

The exothermic intermetallic reaction of two or more metals, for example, ziconium and boron, to form an intermetallic compound is employed as a heat source for a thermal battery. Ternary as well as binary systems are possible. The particular metals of the present invention are chosen to be relatively easily initiated in an alloying reaction which is sufficiently exothermic and self-sustaining. They are formed as powdered mixtures, films, or foil sandwiches with the metals in intimate contact in approximately stoichiometric proportions. They can be formed in sturdy shapes compatible as replacements for heat pads, heat pellets, or heat paper in many thermal batteries.

Intermetallics are formed without a vapor phase and are advantageous in thermal batteries in that their formation is completely gasless. Unlike combustion reactions, they are independent of environmental pressure, and they are also non-hygroscopic.

The reaction mixture may be initiated by hot wires, first fires, and, in some cases, optical or laser radiation.

BRIEF DESCRIPTION OF THE DRAWING

The single FIGURE of the drawing represents an exploded view of the main elements of a thermal battery cell.

DESCRIPTION OF THE PREFERRED EMBODIMENT

The single FIGURE of the drawing is an exploded view of the main elements of a thermal battery cell. The numeral 1 indicates heat source elements. The numeral 2 designates a cathode. The numeral 3, designates an anode. A depolarizer, electrolyte and binder (DEB) pellet is indicated by 4. The entire cell may be held together by a pyrex tube 5 or the like.

Exothermic intermetallic reactions (EIR's) have received little attention in terms of possible engineering applications. Literature reports on their thermodynamic properties are often in conflict. The discussions of these reactions given by A. P. Hardt and P. V. Phung at p. 77 and A. P. Hardt and R. W. Holsinger at p. 91 of Vol. 21 *Combustion And Flame* (1973) and by A. G. Merzhanov and I. P. Borovinskaya at p. 195, Vol. 10, *Combustion Science & Technology* (1975) are cited for a more complete discussion of the EIR portion of present invention.

There are at least 50 exothermic intermetallic reactions considering bimetallic systems alone. However, this array of reaction possibilities is severely limited by a number of factors.

The overriding criterion is that the adiabatic reaction temperature must exceed the melting point of the product in order for the reaction to proceed in a self-sustaining fashion. The liquid phase is necessary to propagate the resultant condensed phase reaction.

The melting points of intermetallic compounds and many temperatures of their reactions are available from the literature, including the representative works previously cited.

A related factor to be considered is thermal conductivity or diffusivity of the system. High thermal conductivity of an element in the mixture will cause heat to be conducted away from the reaction zone thereby causing a slow reaction rate and difficult initiation. Discussion of selected examples serve to illustrate this factor.

Thermal conductivity is usually expressed in cal/cm sec °K. and the related property of thermal diffusivity is expressed as $cm^2$/sec. Carbon and boron have conductivities of 0.002266 and 0.00029 and diffusivities of 0.0115 and 0.0009 respectively. These elements are quite satisfactory in this regard and yield high energy systems. Nickel and aluminum measure 0.0376 and 0.258 conductivity and 0.052 and 0.451 diffusivity, respectively. Their mixtures are hard to ignite and do not yield high adiabatic reaction temperatures.

Another criterion useful in selecting a suitable EIR system is the eutectic or peritectic temperature. When considering a phase diagram, a low-lying eutectic temperature is related to ease of initiation. For instance, Al—Pd, 620° C. and Al—Li, 180° C. are easy to initiate while Ti—2B at 1542° C. and V—2Si at 1402° C. are more difficult, though not unsatisfactory in this regard.

A final criterion to be employed in the selection of a suitable EIR system is the reaction rate. A thermal battery heat source must have a relatively fast reaction rate because of the rapid rise-time generally required. The principal parameters of a reaction rate are thermal and mass diffusivities, particle size, and heat of reaction. Mass diffusivity refers to the diffusion of the reacting metals through the alloy product, which, as stated, must be liquid. Published data on diffusion may be obtained from standard references. Various reaction rates may also be obtained from these references. The major factor in determining reaction rate, however, is particle size. The metals should be in intimate contact on the molecular level. The smaller the particle size, the faster the reaction. For instance in a $ZrB_2$ system of 2, 15 and 50 $\mu$m particle size, reaction rates of 9.7, 2.4 and 0.01 cm/sec have been reported. The particle size range of 2-3 $\mu$m present the same pyrophoric dangers of the prior art compositions. The particle size chosen must be arrived at by balancing the above criteria.

Using the foregoing criteria, system of Zr—2B, Ti—C, Zr—C, V—2Si, Al—Li, Ca—2Al, Ca—Si, and especially Ti—2B are preferred. It should be understood, however, that for purposes of the present invention, EIR systems satisfying the above criteria are considered equivalent to the systems specifically set out herein.

Having chosen an appropriate EIR system, the practice of the present invention requires that particles of the selected metals be formed into pellets or strips of the desired shape while maximizing contact between the species of metals.

The most common technique is to mix fine powders of the ingredients and press them into the desired shape. This technique, while simple, is somewhat hazardous due to the pyrophoric potential of fine metal powders. To aid in obtaining a consolidated pellet, about 1% of a rubbery binder, such as Vistanex, may be added to hard to bind systems, such as those using silicon or carbon. The amounts of each metal used should be approximately the stoichiometric proportions required for the intermetallic component formed.

A more desirable method is to formulate foil sandwiches by cold-rolling thin foils equal to, or less than, 0.025 mm thickness. Explosively welding or cladding the foils is also possible using conventional techniques.

Another method involves vapor deposition. One metal may be deposited on particles or foils of another or both metals may be co-deposited on a suitable substrate, such as quartz gauze or plates. The sputtering rates of the various metals must be adjusted to allow them to be deposited in the proper proportions. For instance boron has much lower sputtering rate than titanium, and Ti/2B mixtures deficient in boron were found to be difficult to initiate. This problem may be circumvented by depositing alternate layers of the desired metals.

Another vapor deposition technique worthy of mention involves blending and hot pressing powdered mixtures of the desired metals into a billet of the appropriate composition. The billet is placed in a plasma furnace and plasma coated onto the target.

Initiation of EIR's may be brought about by a number of methods. Conventional ignition methods such as first fires and/or electric matches may be adapted for use with EIR systems.

A resistively heated nichrome ribbon has been successfully employed to initiate Ti/2B powder, which can in turn be used to ignite pressed mixtures. Ti/2B powder has also been initiated with laser radiation from a 250 watt carbon dioxide laser.

A xenon-arc-image furnace used experimentally to determine ease of initiation also illustrates initiation by radiant energy. Light from a xenon arc lamp is focused by a concave mirror onto the metallic mixture. Ti/2B pellets were successfully initiated at 50 cal/$cm^2$ using this procedure.

Although bimetallic mixtures have been described, ternary systems are possible and in some cases may be desirable, as for instance, adding constituents of low thermal conductivity (e.g. boron, carbon) to modify ignition properties or reaction rates.

What is claimed is:

1. A thermal battery comprising at least one cell having a cathode, an anode, a solid electrolyte between said cathode and anode and a heat source confined in a position relative to said electrolyte such that said heat source will melt said electrolyte when activated, said heat source being comprised of at least one foil of a first metal and at least one foil of a second metal, said foils being equal to or less than 0.025 mm. in thickness and being placed in a relationship to one another such that said first metal and said second metal will react together exothermically in a self-sustaining manner producing an exotherm great enough to melt said electrolyte upon activation.

2. A thermal battery according to claim 1 wherein said first metal is titanium and said second metal is selected from the group consisting of boron and carbon.

3. A thermal battery according to claim 1 wherein said first metal is zirconium and said second metal is selected from the group consisting of boron and carbon.

4. A thermal battery according to claim 1 wherein said first metal is aluminum and said second metal is selected from the group consisting of lithium and calcium.

5. A thermal battery according to claim 1 wherein said first metal is calcium and said second metal is silicon.

6. A thermal battery according to claim 1 wherein said first metal is vanadium and said second metal is silicon.

7. A thermal battery comprising at least one cell having a cathode, an anode, a solid electrolyte between said cathode and anode and a heat source contained in a position such that it will melt said electrolyte when activated, said heat source comprising a first metal upon which a second metal has been vapor deposited with said first metal and said second metal being chosen so that they will react together exothermically upon activation in a self-sustaining manner and produce an exotherm large enough to melt said electrolyte.

8. A thermal battery according to claim 7 wherein said second metal is vapor deposited on particles of said first metal.

9. A thermal battery according to claim 7 wherein said second metal is vapor deposited on a foil of said first metal.

10. A thermal battery comprising at least one cell having a cathode, an anode, a solid electrolyte between said cathode and anode and a heat source confined in a position relative to said electrolyte such that it will melt said electrolyte upon activation, said heat source comprising a substrate which has a first metal and a second metal co-deposited on it, said first metal and said second metal being chosen so that they will react together exothermically upon activation in a self-sustaining manner and produce an exotherm large enough to melt said electrolyte.

11. A thermal battery comprising at least one cell having a cathode, an anode, a solid electrolyte between said cathode and anode and a heat source located in a position relative to said electrolyte such that it will melt said electrolyte upon activation, said heat source comprising a pressed pellet containing at least two metal powders, said powders being chosen so that they will react exothermically with one another upon initiation to produce an exotherm large enough to melt said electrolyte.

* * * * *